United States Patent
Roach et al.

(10) Patent No.: US 9,185,211 B2
(45) Date of Patent: Nov. 10, 2015

(54) APPARATUSES AND METHODS FOR OPERATING A COMMUNICATION SYSTEM IN ONE OF A TONE MODE AND A TEXT MODE

(71) Applicant: SORENSON COMMUNICATIONS, INC., Salt Lake City, UT (US)

(72) Inventors: Isaac Roach, Murray, UT (US); Richard Shields, Salt Lake City, UT (US); Grant A. Beckmann, Salt Lake City, UT (US)

(73) Assignee: SORENSON COMMUNICATIONS, INC., Salt Lake City, UT (US)

( * ) Notice: Subject to any disclaimer, the term of this patent is extended or adjusted under 35 U.S.C. 154(b) by 105 days.

(21) Appl. No.: 14/075,968

(22) Filed: Nov. 8, 2013

(65) Prior Publication Data

US 2015/0131786 A1    May 14, 2015

(51) Int. Cl.
*H04M 11/00* (2006.01)
*H04M 3/42* (2006.01)
*G06F 17/28* (2006.01)

(52) U.S. Cl.
CPC ........... *H04M 3/42382* (2013.01); *G06F 17/28* (2013.01); *H04M 3/42391* (2013.01)

(58) Field of Classification Search
None
See application file for complete search history.

(56) References Cited

U.S. PATENT DOCUMENTS

| | | |
|---|---|---|
| 6,421,425 B1 * | 7/2002 | Bossi et al. ............... 379/52 |
| 6,480,825 B1 | 11/2002 | Sharma et al. |
| 6,487,209 B1 | 11/2002 | Valentine et al. |
| 6,631,183 B1 | 10/2003 | Rautila et al. |
| 6,791,976 B2 | 9/2004 | Huh et al. |
| 6,993,488 B2 | 1/2006 | Vainio et al. |
| 7,274,779 B2 | 9/2007 | Casey |
| 7,289,606 B2 | 10/2007 | Sibal et al. |
| 8,676,236 B1 | 3/2014 | Gautam et al. |
| 2003/0118171 A1 | 6/2003 | Mitsuo |
| 2005/0004801 A1 * | 1/2005 | Liebermann ............ 704/271 |
| 2009/0086012 A1 | 4/2009 | Thapa |

FOREIGN PATENT DOCUMENTS

| | | |
|---|---|---|
| EP | 617534 | 3/1994 |
| WO | 2005031995 A1 | 4/2005 |

* cited by examiner

*Primary Examiner* — Maria El-Zoobi
(74) *Attorney, Agent, or Firm* — TraskBritt

(57) ABSTRACT

Apparatuses and methods are disclosed for enabling a first user at a first communication device to communicate with a far-end user at a second communication device via a relay service providing translation services for the first user. The communication system may be operable in a plurality of modes, including a tone mode in which an audible tone conveying a message may be transmitted to the second communication device regardless of a format of the character data generated by the first communication device. A text mode may include sending a text signal corresponding to the message being displayed at the relay service regardless of the format of the character data. Switching modes may be responsive to a determination that the far-end user is a live person. Related methods of operating the communication system are also disclosed.

24 Claims, 3 Drawing Sheets

APPARATUSES AND METHODS FOR OPERATING A COMMUNICATION SYSTEM IN ONE OF A TONE MODE AND A TEXT MODE

TECHNICAL FIELD

The present disclosure relates to conveying information from data signals from a communication device to a far end communication device according to a plurality of different modes. More specifically, the present disclosure relates to operational modes for conveying information from data signals during communication sessions involving hard-of-hearing people.

BACKGROUND

Traditional communication systems, such as standard and cellular telephone systems, enable verbal communications between people at different locations and dual tone multiple frequency (DTMF) communications for transmitting information to machines via tones. Communication systems for hard-of-hearing individuals may also enable non-verbal communications instead of, or in addition to, verbal communications. Some communication systems for hard-of-hearing people enable communications between communication devices for hard-of-hearing people and communication systems for hearing users (e.g., standard telephones, cellular telephones, etc.). For example, a video relay service (VRS) may provide speech to sign language translation services, and sign language to speech translation services for a communication session between a video phone for a first user and a traditional telephone for a hearing user.

Conventionally, the hearing-impaired user communicates with a call assistant (e.g., communicating via sign language), and then the call assistant conveys the messages to the far-end user. The call assistant may act as a translator for both the hearing-impaired user (e.g., communicating via sign language) and the far-end user (communicating via speech communication). If the far-end user is not a live person (e.g., an automated phone menu system), the call assistant may interpret the automated menu options to the hearing-impaired user via sign language. The hearing-impaired user may respond by using sign language to instruct the call assistant which selection to choose. The call assistant then makes the appropriate selection. For example, the call assistant may speak the message from the hearing-impaired user if the automated phone menu system is configured to recognize and interpret voice. Alternatively, the far-end user (e.g., automated phone menu system) may be configured to recognize DTMF signals. Therefore, the call assistant may use a numeric keypad configured to send such DTMF signals to the automated phone system. The inventors have appreciated that, at times, the hearing-impaired person may desire to convey information through the communication device to the far-end user through methods other than by sign language communication, which functionality is not offered by conventional VRS systems.

BRIEF SUMMARY

In some embodiments, the present disclosure comprises an apparatus comprising a relay service. The relay service is configured to provide translation services during a communication session with a first user at a first communication device a far-end user at a second communication device, and receive character data from the first communication device. The character data is associated with a message desired to be conveyed to the second communication device. The relay service is further configured to convey the message to the second communication device in a tone format during a tone mode of the relay service regardless of a format of the character data.

In some embodiments, the present disclosure comprises an apparatus comprising a first communication device configured to participate in a communication session with a second communication device via a relay service for providing translation services between a first user at the first communication device and a far-end user at the second communication device. The first communication device comprises an input device and a control circuit. The input device is configured for detecting information provided by the first user to the input device. The control circuit is configured to cause an audible tone corresponding to information to be sent to the second communication device responsive to a determination that the far-end user is not a live person, and send a text signal corresponding to the information provided by the first user to the input device to be displayed at the relay service responsive to a determination that the far-end user is a live person.

In some embodiments, the present disclosure comprises a method of operating a communication system. The method comprises receiving character data from a first communication device during a communication session between a first communication device and a second communication device via a relay service providing translation services for the first user, determining an operational mode from among a tone mode and a text mode of the communication system based on a type of far-end user at the second communication device, and transmitting an audible tone to the second communication device during the tone mode of the communication system regardless of a format of the character data.

In some embodiments, the present disclosure comprises a method of operating a communication system according to a plurality of modes. The method comprises receiving a user input for conveying character data from a first user at a first communication device to a far-end user at a second communication device through a relay service providing translation services, determining an operational mode of the communication system from a tone mode and a text mode, transmitting the character data to the relay service as at least one tone responsive to a determination of the tone mode, and transmitting the character data to the relay service as text data responsive to a determination of the text mode.

DETAILED DESCRIPTION

Figure 1:
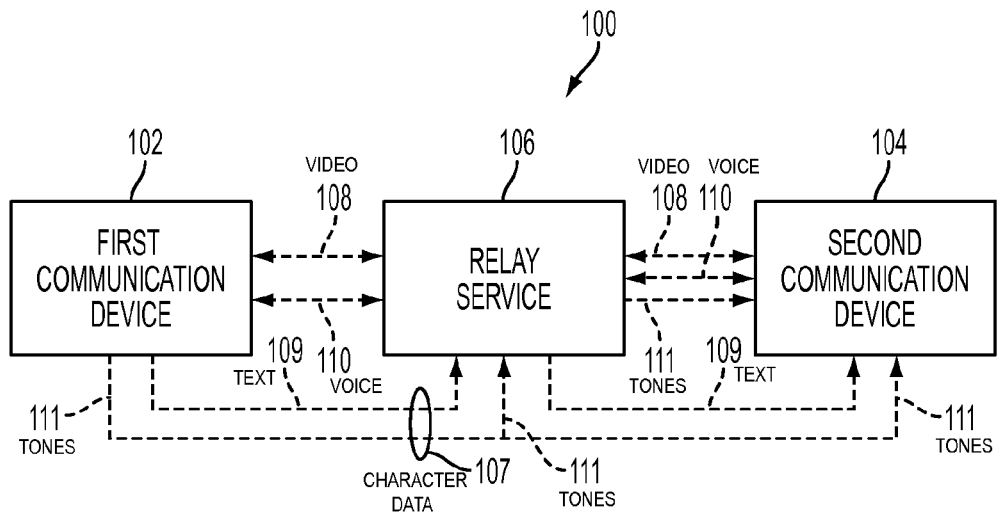
FIG. 1 is a simplified block diagram of a communication system according to an embodiment of the present disclosure.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 3 will be mostly in the numerical format 3xx.

Embodiments of the present disclosure include apparatuses and methods for operating a communication system. It should be noted that while the utility and application of the various embodiments of the present disclosure are described herein with reference to a relay service for individuals having disabilities, the embodiments of the present disclosure also include any environment for a communication system to selectively operate in one of a plurality of different modes, such as where a text mode and a tone mode may be desirable.

FIG. 1 is a simplified block diagram of a communication system 100 according to an embodiment of the present disclosure. The communication system 100 may include a video relay service (VRS) or other communication system configured to facilitate communication between users having a disability and far-end users (e.g. hearing users, computerized systems, etc.).

The communication system 100 may include a first communication device 102 and a second communication device 104 that are configured to participate in communication sessions through one or more networks. The communication system 100 may also include a relay service 106 configured to communicate with the first communication device 102 and the second communication device 104. The first communication device 102 may include any device configured to participate in a communication session with the second communication device 104, the relay service 106, or a combination thereof.

In some embodiments, the first communication device 102 may comprise a communication device for an individual having a disability, such as a person having a hearing impairment, speech impairment, and/or vision impairment. Communication devices that may be used to assist users having such disabilities may include a video phone device, a text-captioned device, a braille display device, keyboards, other devices or accessibility interfaces, and combinations thereof. The first communication device 102 may include a computing device configured to execute software directed to perform such communication capabilities. Examples of suitable computing devices may include a desktop computer, a laptop computer, a tablet computer, a personal digital assistant (PDA), a smartphone, and other computing devices.

In a typical relay system for users having disabilities, the first communication device 102 may be operated by a user having a disability and the second communication device 104 may be operated by a hearing-capable user. For convenience, the first communication device 102 may also be referred to as the "near-end" device, while the second communication device 104 may also be referred to herein as the "far-end" device. The user of the first communication device 102 may be referred to as the "near-end user," and the user of the second communication device 104 may be referred to as the "far-end user." Of course, it is recognized that "near-end" and "far-end" are relative terms depending on the perspective of the particular user. Thus, the terms "near-end" and "far-end" are used as a convenient way of distinguishing between users.

The near-end user may have a disability that may make it difficult to communicate with the far-end user. The near-end user may be a hearing-impaired (e.g., deaf) user, a speech-impaired (e.g., mute) user, a visually-impaired (e.g., blind) user, or have some other impairment or combinations thereof. The far-end user may be a hearing-capable user, a computer system (e.g., an automated system), an individual having a disability, or a combination thereof.

The relay service 106 is configured to interpret communication between the first communication device 102 and the second communication device 104. The operator at the relay service 106 performing the interpretation may be referred to as a "call assistant." Communication between the first communication device 102 and the relay service 106 may be typically performed through video or text communication between the near-end user and the call assistant, while communication between the relay service 106 and the second communication device 104 may be typically performed using voice communication between the call assistant and the far-end user.

For near-end users that have vision capabilities, video data 108 may be transmitted between the first communication device 102 and the relay service 106 to facilitate visual communication between the near-end user and the call assistant. Thus, the video data 108 may include video information conveying video images of the near-end user and the call assistant. For example, the video data 108 may include video images of the near-end user and the call assistant. As a result, the near-end user and the call assistant may communicate with each other using sign language, facial expressions, lip reading, and/or other body language between the near-end user and the call assistant.

In some embodiments, voice data 110 may be transmitted between the first communication device 102 and the relay service 106. For example, if the near-end user has at least some speech capabilities (e.g., users that are hearing-impaired but have some ability to speak), voice data 110 may be transmitted from the first communication device 102 to the relay service 106. If the near-end user has at least some hearing-capabilities (e.g., users that are not completely deaf), voice data 110 may be transmitted from the relay service 106 to the first communication device 102. In some embodiments, however, audio from the first communication device 102 may be disabled such that the relay service 106 and/or the second communication device 104 may not be able to hear any speech or other audible noise from the first communication device 102.

In some embodiments, the first communication device 102 may include a braille display for visually-impaired users to communicate with the relay service 106. Such a braille display may include the visually-impaired user to speak and/or type information that is sent to relay service 106 for translation to the far-end user, and receive information from the relay service 106 that is converted to braille on the first communication device 102 for the near-end user to understand.

The relay service 106 and the second communication device 104 may be configured to communicate voice data 110 with each other to facilitate hearing communication between the call assistant and the far-end user (e.g., a live person, a computer system, etc.). The voice data 110 may include audible information shared between the relay service 106 and the second communication device 104. For example, the voice data 110 may include audible speech of the call assistant and the far-end user. As a result, the communication system 100 may facilitate translated communication for near-end users with others regardless of whether the far-end user is able to communicate using the mode of communication for the near-end user. In some embodiments, the voice data 110 transmitted to the second communication device 104 may also include audible speech of the near-end user if the first communication device 102 is configured to transmit audio, and such audio is desired to be heard by the far-end user. Voice data 110 generated by the far-end user is not limited to live voice from a live person. For example, the far-end user may include an automated telephone menu system that transmits voice data 110 that includes synthesized voice, recorded voice, or other audible information intended to convey information (e.g., interactive voice response (IVR)).

In some embodiments, the second communication device 104 may be configured to also send and receive video communications. For example, both the first communication device 102 and the second communication device 104 may be video phones of a VRS communication system. In such embodiments, the second communication device 104 may be configured to receive the video data 108 including the video images of the near-end user, the call assistant, or a combination thereof. The second communication device 104 may be configured to receive the video data 108 from the first communication device 102, the relay service 106, or combinations thereof. Receipt of the video data 108 by the second communication device 104 may enable the far-end user to observe non-verbal communication from the near-end user. Thus, the communication system 100 may also be configured to facilitate communication between near-end users.

At times, it may be desirable for the far-end user, the call assistant, or combinations thereof, to receive additional communication may be desirable for the near-end user to transmit as character data 107 that is not voice data 110 or video data 108. By way of non-limiting example, where the far-end user includes IVR technology, it may be desirable for the far-end user to receive tones 111 (e.g., DTMF tones). In such situations, the call assistant may translate (e.g., via sign language, text captioning, etc.) menu options from the far-end user for the near-end user. As discussed above, conventional communication systems may require the near-end user to respond by using sign language via the video data 108, whereupon the call assistant may use a numeric keypad at the relay service 106 to send tones 111 to the second communication device 104. Such a system may result in errors, inefficiency, and/or an undesirable user experience because of multiple steps in the translation. Also by way of non-limiting example, the far-end user may be a live person that requests character-intensive information, such as lengthy numbers (e.g., phone numbers, social security numbers, etc.), passwords, or codes. Conventional communication systems may require the near-end user to respond by using sign language via the video data 108, whereupon the call assistant may translate the sign language to speech for the far-end user via the voice data 110. Such a system may also result in errors, inefficiency, and/or an undesirable user experience.

Embodiments of the present disclosure enable the near-end user at the first communication device 102 to convey character data 107 to the relay service 106 and/or the second communication device 104. Such character data 107 may be different than the video data 108 and the voice data 110 transmitted by the communication system 100. As an example, the first communication device 102 may include an input device (not shown in FIG. 1) configured to generate the character data 107 responsive to a user input. The input device may include a numeric keypad, a keyboard, a touchscreen, a remote control, a mouse, other input device, or combinations thereof. The character data 107 may be transmitted as tones 111, text signals 109, or other formats for conveying character-based information.

Depending on the capabilities of the far-end user, it may be desirable for the far-end user to receive certain types of character-based information, but not others. The communication system 100 may be configured to selectively operate in one of a plurality of different modes that may determine how the character data 107 is conveyed to the relay service 106 and/or the second communication device 104. For example, the communication system 100 may be configured to selectively operate in at least one of a tone mode and a text mode. In some embodiments, the tone mode may comprise a DTMF mode, and the text mode may comprise an RTT mode. For convenience, the tone mode and the text mode may be referred to herein as the DTMF mode and the RTT mode, respectively.

The term "tone mode," as used herein, refers to a functional mode in which at least one audible tone (e.g., tone 111) is received by the second communication device 104 responsive to the user input from the first communication device 102 regardless of the format of the character data 107 generated by the first communication device 102. The audible tone 111 corresponds to the information input by the near-end user while conveying the character data 107.

For example, the first communication device 102 may include an input device having a numeric keypad with keys corresponding to the numbers 0 through 9, "*" and "#." If the near-end user selects (e.g., presses) one of the keys, the first communication device 102 may generate the character data 107 corresponding to the key selected by the near-end user. The character data 107 generated by the first communication device 102 may be formatted as a tone 111 or a text signal 109. In tone mode, however, the character data 107 that is received by the second communication device 104 may be formatted as a tone 111 regardless of how the character data 107 was first generated.

In some embodiments, the character data 107 may initially be generated by the first communication device 102 as a tone 111. In such an embodiment, the tone 111 may be transmitted from the first communication device 102 to the second communication device 104 directly, if such a direct connection exists. In some embodiments, the tone 111 may be transmitted from the first communication device 102 to the relay service 106, which may be configured to route the tone 111 to the second communication device 104.

In some embodiments, the character data 107 may initially be generated by the first communication device 102 as a text signal 109. In such an embodiment, the text signal 109 may be transmitted from the first communication device 102 to the second communication device 104. The relay service 106 may receive the text signal 109 and generate the appropriate tone 111 corresponding to the information being conveyed. The relay service 106 may then transmit the tone 111 to the second communication device 104. As a result, during tone mode the relay service 106 may transmit the tone 111 to the second communication device 104 regardless of the format that the character data 107 was received by the relay service 106.

By way of non-limiting example, the tone 111 may include two different frequencies depending on the input key selected by the near-end user, as illustrated in Table 1.

TABLE 1

|  | 1209 Hz. | 1336 Hz. | 1477 Hz. |
|---|---|---|---|
| 697 Hz. | 1 | 2 | 3 |
| 770 Hz. | 4 | 5 | 6 |
| 852 Hz. | 7 | 8 | 9 |
| 941 Hz. | * | 0 | # |

For example, if the "5" key is selected by the near-end user, the appropriate tone 111 may be generated by adding two sinusoidal signals, one with a frequency of 1336 Hz., and the other with a frequency of 770 Hz. The tones 111 may be received by the second communication device 104, and analysis of the received tones may reveal that the "5" key was selected.

As briefly mentioned above, the communication system 100 may also be configured to operate in a text mode. The term "text mode," as used herein, refers to a functional mode in which at least one text signal (e.g., text signal 109) is displayed to the call assistant and/or the far-end user regardless of the format of the character data 107 generated by the first communication device 102. If the text is displayed to the call assistant, the call assistant may then speak the message from the text to the far-end user at the second communication device 104.

For example, the near-end user may select a user input at the first communication device 102 to convey a message to the far-end user using character data 107. The character data 107 may be transmitted as a text signal 109, a tone 111, or some other format. In text mode, character data 107 may be displayed as text on an electronic display within view of the call assistant regardless of the format that the character data 107 was generated by the first communication device 102. For example, in some embodiments the character data 107 may be received by the relay service 106 as a text signal 109, whereupon the character data 107 may be displayed as text on the call assistant's electronic display with little, to no, additional conversion of the textual data. In some embodiments, however, the character data 107 may be received by the relay service 106 as a tone 111 that the relay service 106 converts to the corresponding text displayed on the call assistant's electronic display. The call assistant may then read the text and speak with the far-end user via the voice data 110. Thus, the text mode may include audio being transmitted to the second communication device 104 to convey the message from the character data 107.

For example, the far-end user may request information from the near-end user (via the relay service 106) that may be desirable to transmit through character data 107 generated by user inputs to an input device rather than sign language. Examples of such data may include numerical information such as a social security number, an account number, a phone number, etc. The call assistant may listen to the request from the far-end user via voice data 110 between the second communication device 104 and the relay service 106, and communicate the request using sign language to the near-end user via video data 108 between the relay service 106 and the first communication device 102. The near-end user may respond to the request by entering the appropriate character information into the input device. The call assistant may receive the character data 107 on the electronic display at the relay service 106 via text signal 109, and speak the character data 107 to the far-end user via voice data 110. In some embodiments, the second communication device 104 may be configured to accept a text signal 109. In such an embodiment, the second communication device 104 may be configured to receive the text signal 109 in addition to, or in the alternative of, the call assistant speaking the character information to the far-end user during text mode.

Thus, the communication system 100 may be configured to switch between modes that convey a message from character data 107 (e.g., digit commands from the near-end user) either as tones, audio, or text depending on the capabilities of the far-end user. It may be desirable to operate the relay service 106 in the text mode while a far-end user is a live person, as opposed to in the tone mode. For example, the audible tones associated with the tone mode may be distracting or unpleasant to a live person. It is also unlikely for a live person to be able to interpret a useful meaning from the audible tones of tone mode signals. Therefore, during text mode, even if the character data 107 is received by the relay service 106 as a tone 111, the information may be conveyed to the far-end user without the relay service 106 passing on the audible tones 111 to the second communication device 104. Rather, the information may be displayed as text on the electronic display of the relay service 106, and the call assistant may speak the message as audio that is transmitted to the second communication device with the voice data 110. In some embodiments, the second communication device 104 may be configured to receive text data 109 such that relay service 106 may convey the message as text data 109 to the second communication device 104.

It may be desirable to operate the relay service 106 in the tone mode if the far-end user is configured to accept DTMF signals. In general, accepting DTMF signals means that the far-end user is not a live person. For example, the second communication device 104 may be configured to transmit one of recorded speech signals and synthesized speech signals (e.g., voice data 110) to the relay service 106, the first communication device 102, or combinations thereof during a communication session. Recorded speech and synthesized speech messages often request interaction through the selection of keys that result in audible tones 111 being sent to the second communication device 104. By way of non-limiting example, automatic answering services, over the telephone automatic bill payment, banking, surveys, and other services often request a user to make selections that generate audible tones 111. As a result, the communication system 100 may be configured to operate in the tone mode responsive to a determination that a live person is not operating the second communication device 104.

The communication system 100 may be configured to operate in the text mode responsive to a determination that a live person is operating the second communication device 104. The determination of whether a far-end user is a live person participating in the communication session may be made manually, automatically, or a combination thereof.

A manual determination may be made by the call assistant distinguishing live speech from recorded speech and/or synthesized speech. The call assistant may be prompted to provide a result of the determination. For example, the call assistant may make a selection on an input device at the relay service 106 to indicate which mode is desired.

An automatic determination may be made by analyzing speech signals from the second communication device 104. The automatic determination may be made by the relay service 106, the first communication device 102, or combinations thereof. For example, the voice data 110 received from the second communication device 104 may be analyzed to determine if a recording, synthesized speech, or a live person is the source of the voice data 110. Different characteristics of the voice data 110 may be analyzed, such as audio quality, cadence, or other factors. For example, a system and method for detecting recorded speech is described in U.S. Pat. No. 6,480,825 to Sharma et al., and entitled "System and Method for Detecting a Recorded Voice," the disclosure of which is hereby incorporated herein in its entirety by this reference. As an example, Sharma et al. disclose training a pattern classifier, such as a Neural Tree Network, to distinguish between live and recorded speech. In addition, an apparatus and method for detecting errors in synthesized speech is described in U.S. Pat. No. 6,993,488 to Vainio et al., and entitled "Audible Error Detector and Controller Utilizing Channel Quality Data and Iterative Synthesis" the disclosure of which is hereby incorporated herein in its entirety by this reference. In particular, Vainio et al. disclose that characteristics atypical of human speech may be detected in synthesized speech.

In some embodiments, both a manual determination and an automatic determination of whether a live person is operating the second communication device 104 may be made. For example, an automatic determination may be made, and the call assistant may be prompted to confirm the determination. Also by way of example, an automatic determination may be attempted, and the call assistant may be prompted to make a manual determination if the automatic determination fails to make an adequate determination. In addition, an automatic determination may be made, but the call assistant may be able to manually override the automatic determination and provide a manual determination.

In addition, the communication system 100 may change modes during the same communication session as conditions may change. For example, a communication session may initially be answered by an automated menu system that eventually leads to a live operator as the far-end user. Some communication sessions may include a live operator transferring the call to a computerized system. At such transitions, a new mode may be detected by the communication system 100 to change the operating mode thereof.

In some embodiments, the relay service 106 may be configured to cause the communication system 100 to operate in the appropriate one of the tone mode and the text mode. In these embodiments, the phrases "operating the communication system 100 in the tone mode" and "operating the communication system 100 in the text mode" refer to the relay service 106 causing the communication system 100 to operate in the tone mode, and the text mode, respectively. In some embodiments, this mode selection involves the relay service 106 receiving the character data 107 from the first communication device 102 in a first format, and converting the character data 107 to a second format, as needed for the current mode. In some embodiments, however, the relay service 106 may inform the first communication device 102 of the desired mode. The first communication device 102 may then generate the character data 107 in the desired format for the current mode so that conversion by the relay service 106 may not be necessary. In either embodiment, the near-end user may not need to be aware of the mode or require using a different user interface depending on the mode.

In some embodiments, the first communication device 102 may be configured to cause the communication system 100 to operate in the appropriate one of the tone mode and the text mode. In these embodiments, the phrases "operating the communication system 100 in the tone mode" and "operating the communication system 100 in the text mode" refer to the first communication device 102 causing the communication system 100 to operate in the tone mode, and the text mode, respectively. In some embodiments, that may involve the first communication device 102 determining which operating mode should be employed by determining whether the far-end user is not a live person. Such a determination being made by the first communication device 102 may be an automatic determination by analyzing the voice data 110 generated by the second communication device 104 if such voice data 110 is received by the first communication device 102. In other words, some embodiments may include the analysis of the far-end voice data 110 being executed by the first communication device 102. As the near-end user has significantly diminished hearing capabilities, a manual determination by the first communication device 102 may not be desirable.

Regardless of which one of the relay service 106 and the first communication device 102 is configured to cause the communication system 100 to operate in the appropriate one of the tone mode and the text mode, the end result is similar. For example, in either situation, the tone 111 may be received by the second communication device 104 during tone mode regardless of how the first communication device 102 generated the character data 107. Similarly, in either situation, an indicator of the text signal 109 may be displayed by the relay service 106 and/or the second communication device 104 during text mode.

The first communication device 102, the second communication device 104, and the relay service 106 may be configured to transmit the data signals 108, 109, 110, 111 over one or more networks. It should be recognized that even though the data signals 108, 109, 110, 111 are illustrated in the figures as individual lines, that does not mean that the data signals 108, 109, 110, 111 are transmitted separately. For example, some of the data signals 108, 109, 110, 111 may be transmitted together.

The networks used for conveying the data signals 108, 109, 110, 111 may include an internet protocol (IP) network. The networks may also include other networks, such as, for example, public switched telephone networks (PSTNs). The networks may include a wide area network (WAN), a local area network (LAN), a personal area network (PAN), and combinations thereof. In some embodiments, the networks may include a cloud network. The networks may be configured to facilitate wireless communications, communications through cables, and combinations thereof. Some non-limiting examples of suitable wireless communications may include "WiFi," Bluetooth, and mobile wireless networks. Some non-limiting examples of suitable cables include fiber-optic cables, coaxial cables, traditional telephone cables, and Ethernet cables.

Figure 2:
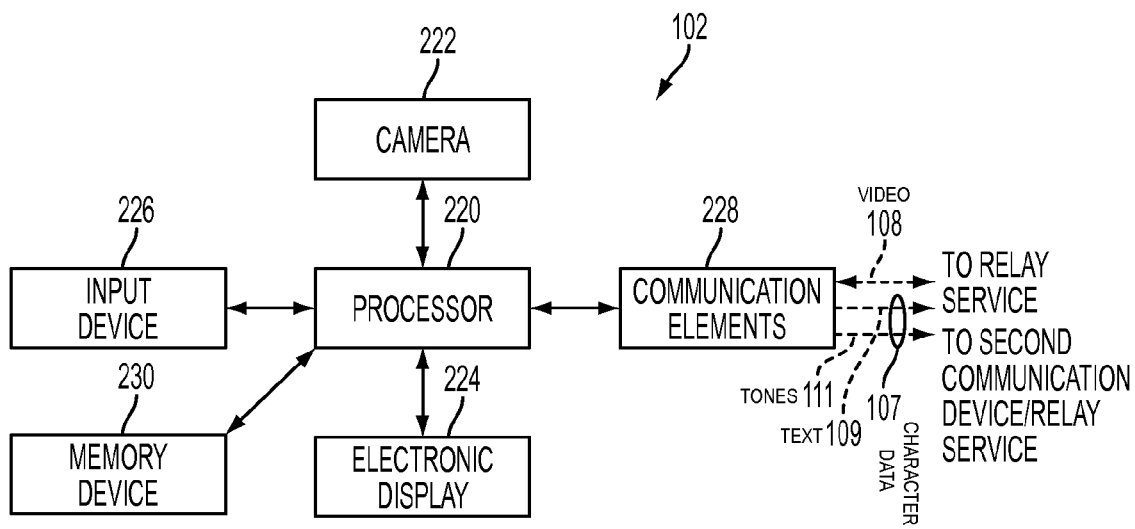
FIG. 2 is a simplified block diagram of the first communication device of FIG. 1.

FIG. 2 is a simplified block diagram of the first communication device 102 of FIG. 1. The first communication device 102 may include a processor 220 operably coupled with a camera 222, an electronic display 224, one or more communication elements 228, and a memory device 230. The first communication device 102 may be configured to communicate video data 108 from the camera 222 to the relay service 106 (FIG. 1) through the communication elements 228. The video data 108 captured by the camera 222 may include sign language communication originated by the near-end user. The first communication device 102 may also be configured to receive video data 108 from the relay service 106 through the communication elements 228 to be displayed by the electronic display 224. The video data 108 received by the first communication device 102 may include sign language communication originated by the call assistant at the relay service 106. The processor 220 may coordinate the communication between the various devices as well as execute instructions stored in computer-readable media of the memory device 230. The memory device 230 may include volatile and non-volatile memory storage for the first communication device 102.

In some embodiments, the first communication device 102 may be configured to cause the communication system 100 to operate in a plurality of different modes of operation. In some embodiments, the processor 220 and the memory device 230 may form a control circuit that is configured to determine which mode of operation the communication system 100 should operate in. As discussed in detail above, the first communication device 102 may be configured to cause the communication system 100 to operate in a text mode responsive to a determination that the far-end user is a live person operating the second communication device 104 that is participating in a communication session with the first communication device 102. The first communication device 102 may also be configured to cause the communication system 100 to operate in the tone mode responsive to a determination that the far-end user is not a live person operating the second communication device 104. Rather, the far-end user may be an automated computer system that employs synthesized voice and/or recorded voice.

In some embodiments, the first communication device 102 may be configured to automatically determine whether a live person is operating the second communication device 104. For example, the processor 220 may be configured to analyze a speech signal from the second communication device 104 to automatically make the determination. The communication elements 228 may be configured to deliver the speech signal as the voice data 110 from the second communication device 104 to the processor 220.

In operation, the input device 226 may receive an input from the near-end user. For example, the input device 226 may include a numeric keypad, a keyboard, a touchscreen, a remote control, a mouse, other input devices, or combinations thereof. For example, during a communication session, the near-end user may desire to enter character data 107 to transmit to the relay service 106, the second communication device 104, or a combination thereof.

For example, the far-end user may include an automated phone menu system that is requesting information from the user. Thus, the communication system 100 may operate in the tone mode. Rather than using sign language to convey this information to the call assistant, the near-end user may enter the information into the input device 226 to generate the character data 107 corresponding to the information entered into the input device 226. The character data 107 may be represented by the text signal 109, the tones 111, or both. The text signal 109 may include textual data, or other data corresponding to the information input by the near-end user. In some embodiments, the text signal 109 is sent to the relay service 106, which may generate the tone 111 that is transmitted to the second communication device 104. Thus, the information entered into the input device 226 may be conveyed to the second communication device 104 directly without the call assistant needing to translate such information from interpreting sign language and then entering the information for the near-end user. As a result, accuracy, efficiency, and/or user experience may be improved with regard to conveying this information to the far-end user. In some embodiments, embodiments, the character data 107 generated by the first communication device 102 as a tone 111 may be sent directly, or routed through the relay service 106, to the second communication device 104.

In some embodiments, the near-end user may desire to transmit character data 107 to the relay service 106 even if the far-end user is a live person and/or does not accept tones 111. Thus, the communication system 100 may operate in the text mode. For example, the far-end user may request information that the near-end user would prefer to enter through an input device 226 rather than using sign language to communicate with the call assistant. The character data 107 may be transmitted to the relay service 106, which may display the character data 107 as text to the call assistant regardless of the format of the character data 107. In the text mode, if the text is displayed to the call assistant, the call assistant may speak the message to the far-end user at the second communication device 104.

In some embodiments, the relay service 106 may be configured to distinguish whether the second communication device 104 may be configured to receive the text signal 109 or whether voice data 110 would be more desirable for conveying the information associated with the text signal 109 as will be discussed more fully with respect to FIG. 3. As for the near-end user at the first communication device 102, knowing the actual way the relay service 106 conveys the information to the second communication device 104 may not be necessary.

In addition, as the determination of the appropriate operational mode is made automatically by the relay service 106, or manually by the call assistant, the near-end user need not know what operational mode the communication system 100 is operating in. In fact, the near-end user need not even know of the existence of the different operating modes of the communication system 100. Thus, embodiments of the present disclosure provide for simplified and effective operation of the first communication device 102 from the perspective of the near-end user.

Figure 3:
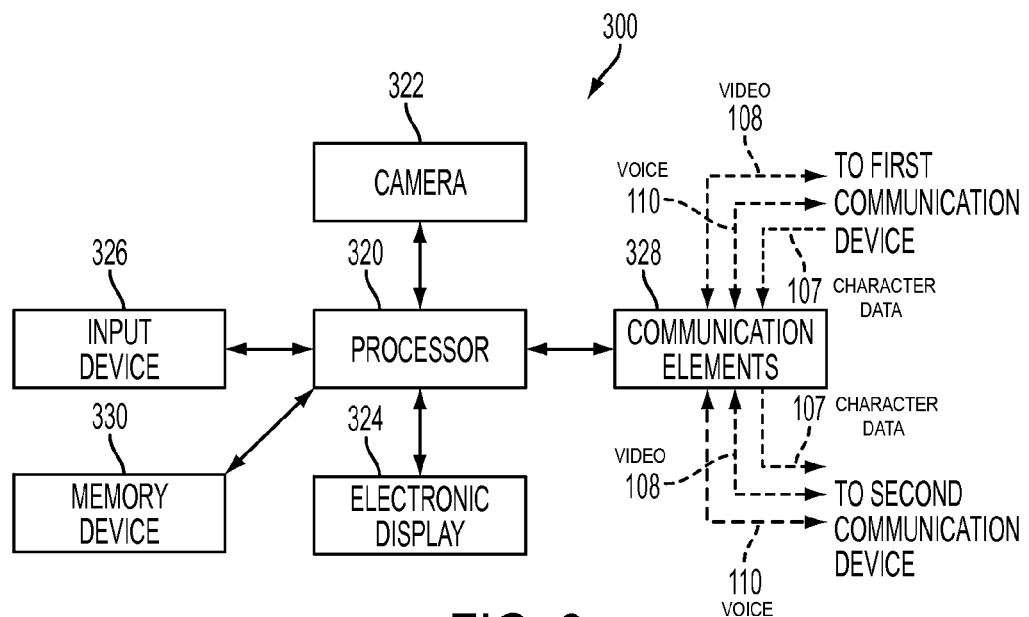
FIG. 3 is a simplified block diagram of a computing device for the call assistant of the relay service of FIG. 1.

FIG. 3 is a simplified block diagram of a computing device 300 for the call assistant of the relay service 106 of FIG. 1. The computing device 300 may include a processor 320 operably coupled with a camera 322, an electronic display 324, one or more communication elements 328, and a memory device 330. The computing device 300 may be configured to communicate video data 108 from the camera 322 to the first communication device 102 (FIG. 1) through the communication elements 328. The video data 108 captured by the camera 322 may include sign language communication originated by the call assistant. The computing device 300 may also be configured to receive video data 108 from the first communication device 102 through the communication elements 328 to be displayed by the electronic display 324. The video data 108 received by the first communication device 102 may include sign language communication originated by the near-end user at the first communication device 102. The computing device 300 may also be configured to send and receive voice data 110 between the relay service 106 and the second communication device 104. As the communication sessions may include speech communications, the computing device 300 may include a microphone and a speaker (not shown) to enable such speech communications.

The processor 320 may coordinate the communication between the various devices as well as execute instructions stored in the memory device 330. The memory device 330 may include volatile and non-volatile memory storage for the computing device 300. In some embodiments, the relay service 106 may be configured to cause the communication system 100 to operate in a plurality of different modes of operation. The processor 320 and the memory device 330 may form a control circuit that is configured to determine which mode of operation the communication system 100 should operate in.

In some embodiments, the relay service 106 may be configured to cause the communication system 100 to operate in a text mode responsive to a determination that the far-end user is a live person operating the second communication device 104 that is participating in a communication session with the first communication device 102. The relay service may also be configured to cause the communication system 100 to operate in the tone mode responsive to a determination that the far-end user is not a live person operating the second communication device 104. Rather, the far-end user may be an automated computer system that employs synthesized voice and/or recorded voice.

In some embodiments the computing device 300 may be configured to detect a manual determination of whether a live person is operating the second communication device 104. For example, the input device 326 may be configured to receive a user selection indicating a result of the manual determination. By way of non-limiting example, the input device 326 may be configured to receive a user selection indicating whether a live person is operating the second communication device 104. Also by way of non-limiting example, the input device 326 may be configured to receive a user selection indicating whether the relay service 106 should operate in the text mode or the tone mode. The input device 326 may be configured to present selectable options directed to indicating whether a live person is operating the second communication device 104, which mode the relay service 106 should operate in, and combinations thereof.

In some embodiments, the computing device 300 may be configured to automatically determine whether a live person is operating the second communication device 104. For example, the processor 320 may be configured to analyze a speech signal from the second communication device 104 to automatically make the determination. The communication elements 328 may be configured to deliver the speech signal from the second communication device 104 to the processor 320.

In some embodiments, the processor 320 may be configured to enable the call assistant to manually override the automatic determination. By way of non-limiting example, the processor 320 may be configured to detect a user selection of a manual override option presented to the call assistant by the input device 326. In addition, in some embodiments, the processor 320 may be configured to enable the call assistant to confirm the automatic determination. By way of non-limiting example, the processor 320 may be configured to cause the input device 326 to prompt the user to confirm a result of the automatic determination.

In some embodiments, the processor 320 may be configured to cause the communication system 100 to switch from operating in one of the text mode and the tone mode to the other of the text mode and the tone mode responsive to a subsequent different determination of whether a live person is operating the second communication device 104. For example, a manual determination that a live person is operating the second communication device 104 may be made, and the processor 320 may cause the communication system 100 to operate in the text mode. The call assistant that made the manual determination may later decide that the second communication device 104 is transmitting speech signals corresponding to recorded speech. The call assistant may make the subsequent determination that no live person is operating the second communication device 104. The processor 320 may cause the communication system 100 to operate in the tone mode responsive to the subsequent determination that no live person is operating the second communication device 104.

In some embodiments, automatic determinations of whether a live person is operating the second communication device 104 may be made periodically throughout a communication session. For example, one of a manual and automatic determination may be made near a beginning of a communication session, and periodic automatic determinations may be subsequently made. Regardless of whether the first communication device 102 or the relay service 106 makes the automatic determination, the communication system may operate in the one of the text mode and the tone mode that corresponds to the most recent determination.

In some embodiments, one of the first communication device 102 and the relay service 106 may be configured to monitor communication signals from the second communication device 104. The one of the first communication device 102 and the relay service 106 may also be configured to cause subsequent manual or automatic determinations to be made responsive to changes in one or more characteristics of the communication signals from the second communication device 104. For example, a sudden increase or decrease in levels of background noise may be indicative of a change between recorded and live speech. Other changes in characteristics that may be significant include changes in channel characteristics, pitch of speech, loudness of speech, signal energy, other characteristics, and combinations thereof.

In some embodiments, the one of the first communication device 102 and the relay service 106 may be configured to cause the communication system 100 to default to operating in one of the text mode and the tone mode before the determination of whether a live person is operating the second communication device 104. Also, the one of the first communication device 102 and the relay service 106 may be configured to cause the communication system to default to operating in one of the text mode and the tone mode responsive to a failure to make an acceptable determination. For example, the one of the first communication device 102 and the relay service 106 may be configured to cause the communication system 100 to operate in the text mode unless there is a determination that the second communication device 104 is not operated by a live person.

Figure 4:
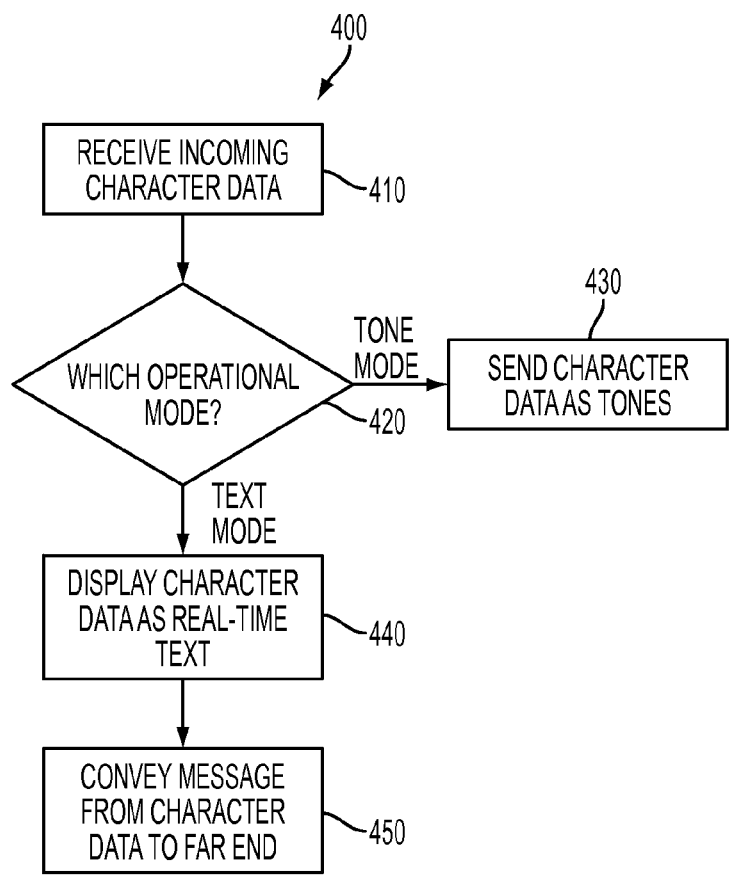
FIG. 4 is a flowchart illustrating a method of operating the communication system according to an embodiment of the present disclosure.

FIG. 4 is a flowchart 400 illustrating a method of operating a communication system 100 according to an embodiment of the present disclosure. At operation 410, the relay service 106 may receive incoming character data 107 in the form of an incoming text signal 109 from the first communication device 102. The text signal 109 may correspond to information desired to be conveyed by a near-end user to the second communication device 104. At operation 420, the relay service 106 may determine which operational mode the relay service 106 is operating in. The relay service 106 may determine an operational mode through a manual input of the call assistant (e.g., through a user interface), through an automatic determination by analyzing the audio data being received by the second communication device 104, through an automatic determination by the first communication device 102, or combinations thereof.

If the communication system 100 is in a tone mode (e.g., the far-end user is a computerized system that accepts DTMF tones), at operation 430 the relay service 160 may send tones 111 corresponding to the character data 107 to the second communication device 104 regardless of the format of the character data 107. In some embodiments, the relay service 106 may simply route the character data 107 to the second communication device 104 if the character data 107 is already configured as tones 111. In some embodiments, the relay service 106 may convert the character data 107 received as the text signal 109 to tones 111 that are transmitted to the second communication device 104.

If the communication system 100 is in the text mode (e.g., the far-end user does not accept DTMF tones, such as being a live person), at operation 440 the relay service 106 may display the character data 107 as real-time text on the electronic display 324 of the call assistant regardless of the format of the character data 107. For example, the relay service 106 may simply receive and display the character data as text with little, to no conversion, if the character data 107 is already a text signal 109. In some embodiments, the relay service 106 may convert the character data 107 to text if the character data 107 received in another format (e.g., tones 111).

At operation 450, the relay service 106 may convey the message to the second communication device 104, such as by the call assistant speaking the text displayed on the electronic display of the relay service 106 to the far-end user as voice data 110. In some embodiments, the second communication device 104 may be configured to accept textual signals. As a result, the relay service 106 may also be configured to transmit the information from the character data 107 to the second communication device 104 as textual data in addition to, or instead of, displaying the textual data to the call assistant to speak to the far-end user.

Figure 5:
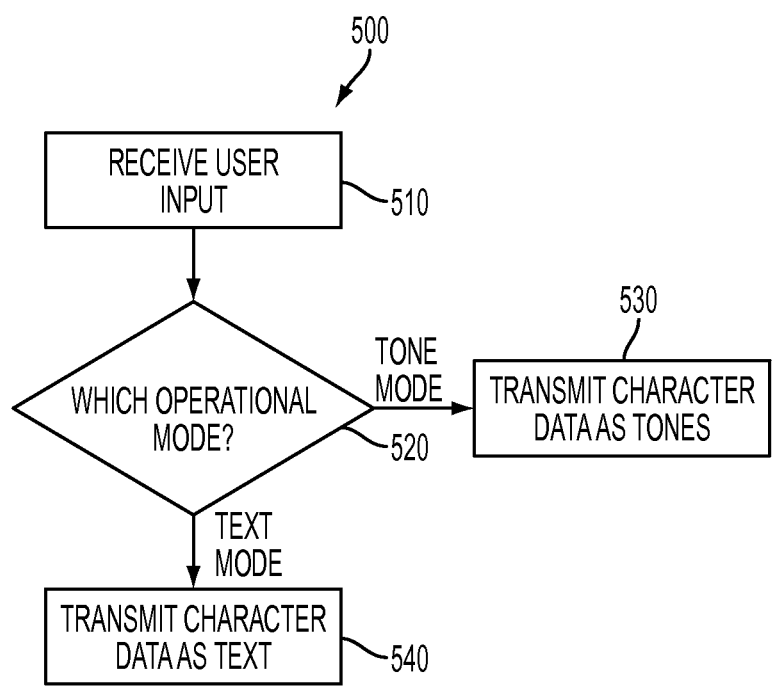
FIG. 5 is a flowchart illustrating a method of operating a communication system according to an embodiment of the present disclosure.

FIG. 5 is a flowchart 500 illustrating a method of operating a communication system 100 according to an embodiment of the present disclosure. At operation 510, the first communication device 102 may receive a user input corresponding to a desired message to convey to the second communication device 104. At operation 520, the first communication device 102 may determine which operation mode operational mode the communication system 100 is operating in. For example, the first communication device 102 may have received an indication from the relay service 106 a desired mode based on a determination by the relay service 106 that the far-end user is one of a live person or an automated system. In some embodiments, the first communication device 102 may be perform at least some of the automated analysis of the far-end speech to automatically determine within the first communication device 102 which mode the communication system 100 should be operating in. The first communication device 102 may inform other devices of the communication system 100 of selected the mode.

If the communication system 100 is in a tone mode, at operation 530, the first communication device 102 may transmit the character data 107 as tones 111. If the communication system 100 is in the text mode, at operation 540, the first communication device 102 may transmit the character data 107 as a text signal 109. It should be noted that the embodiment of FIG. 5 describes a situation, in which the first communication device 102 may be aware of the operational mode (whether by its own detection or being informed of such). As discussed previously herein, it is contemplated that the first communication device 102 may not be aware of the operational mode. As such, the first communication device 102 may transmit the character data 107 to one or both of the relay service 106 and the second communication device 104 in a format that does not match how the relay service 106 and/or the second communication device 104 desires for the particular operational mode. Thus, the relay service 106 may convert the character data 107 to the appropriate format for the current operational mode.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. An apparatus, comprising:
a relay service configured to provide translation services during a communication session with a first user at a first communication device and a far-end user at a second communication device, the relay service configured to:
receive character data from the first communication device, the character data associated with a message desired to be conveyed to the second communication device;
determine an operational mode of the relay service to be a tone mode if the far-end user is not a live person;
determine the operational mode of the relay service to be a text mode if the far-end user is a live person; and
convey the message to the second communication device in a tone format during the tone mode of the relay service regardless of a format of the character data.

2. The apparatus of claim 1, wherein the relay service is further configured to convey the message to the second communication device in a speech format during the text mode of the relay service regardless of the format of the character data.

3. The apparatus of claim 2, wherein the relay service further comprises an electronic display, the relay service further configured to:
convey the message in the tone format by transmitting one or more audible tones corresponding to the message of the character data to the second communication device responsive to a determination that the far-end user is not a live person; and
convey the message in the text format by transmitting text corresponding to the message of the character data to the second communication device responsive to a determination that the far-end user is a live person.

4. The apparatus of claim 1, wherein the relay service is further configured to:
generate voice signals comprising a call assistant's speech voicing the message; and
send the voice signals to the second communication device.

5. The apparatus of claim 4, wherein the relay service is further configured to convey the message to the second communication device in an audio format through the voice signals during the text mode of the relay service regardless of the format of the character data.

6. The apparatus of claim 5, wherein the relay service further comprises an electronic display, the relay service further configured to:
display the message in a text format on the electronic display for the call assistant to read; and
convey the message in the audio format by transmitting the voice signals corresponding to the message of the character data responsive to the call assistant speaking the message displayed on the electronic display.

7. The apparatus of claim 1, wherein the relay service further comprises a computing device configured to analyze a speech signal received from the second communication device and automatically determine whether the far-end user is a live person in response thereto.

8. An apparatus, comprising:
a relay service configured to provide translation services during a communication session with a first user at a first communication device and a far-end user at a second communication device, the relay service configured to:
receive character data from the first communication device, the character data associated with a message desired to be conveyed to the second communication device; and
convey the message to the second communication device in a tone format during a tone mode of the relay service regardless of a format of the character data;
wherein the relay service comprises a computing device configured to analyze a speech signal received from the second communication device and automatically determine whether the far-end user is a live person in response thereto, and wherein the computing device comprises an input device configured to:
enable a call assistant to manually override the automatic determination; and
enable the call assistant to confirm the automatic determination.

9. The apparatus of claim 8, wherein the automatic determination is based, at least in part, on at least one characteristic of the speech signal selected from the group consisting of a level of background noise, channel characteristics, a pitch of speech, a loudness of speech, and a speech signal energy.

10. The apparatus of claim 1, wherein the relay service comprises an input device configured to detect a call assistant's selection indicating a result of a manual determination of whether the far-end user is a live person.

11. An apparatus, comprising a first communication device configured to participate in a communication session with a second communication device via a relay service for providing translation services between a first user at the first communication device and a far-end user at the second communication device, the first communication device comprising:
an input device configured for detecting information provided by the first user to the input device; and
a control circuit configured to:
cause an audible tone corresponding to the information to be sent to the second communication device responsive to a determination that the far-end user is not a live person; and
send a text signal corresponding to the information to be sent to the relay service responsive to a determination that the far-end user is a live person.

12. The apparatus of claim 11, wherein the first communication device comprises a communication element configured to receive speech signals originating at the second communication device, and wherein the control circuit is configured to analyze the speech signal received from the second communication device to automatically determine whether the far-end user is a live person in response thereto.

13. The apparatus of claim 11, wherein the first communication device is configured to receive the determination of whether the far-end user is a live person from the relay service, and wherein the determination is made automatically by the relay service, manually by a call assistant at the relay service, or a combination thereof.

14. The apparatus of claim 11, wherein the control circuit is further configured to cause the audible tone to be sent at least one of directly to the second communication device, and through the relay service for transmission to the second communication device.

15. A method of operating a communication system, the method comprising:
    receiving character data from a first communication device during a communication session between a first communication device and a second communication device via a relay service providing translation services for a first user;
    determining an operational mode from among a tone mode and a text mode of the communication system based, at least in part, on a type of far-end user at the second communication device, wherein determining an operational mode includes:
        determining the tone mode if the far-end user is not a live person; and
        determining the text mode if the far-end user is a live person; and
    transmitting an audible tone correlated to the character data to the second communication device during the tone mode of the communication system regardless of a format of the character data.

16. The method of claim 15, further comprising displaying text on an electronic display at the relay service during the text mode of the communication system regardless of the format of the character data.

17. The method of claim 16, further comprising conveying voice data including information from the text corresponding to the character data displayed on the electronic display from the relay service to the second communication device.

18. The method of claim 15, wherein determining the operational mode further includes:
    prompting a call assistant at the relay service to manually determine if the far-end user is a live person; and
    receiving an input from the call assistant indicating a result of the determination.

19. The method of claim 15, wherein transmitting the audible tone to the second communication device comprises:
    generating the audible tone for the second communication device responsive to the character data having a different format than the audible tone; and
    transmitting the audible tone from the relay service to the second communication device.

20. The method of claim 15, wherein transmitting the audible tone to the second communication device comprises transmitting the audible tone based on the character data having a substantially similar format to the audible tone.

21. A method of operating a communication system according to a plurality of modes, the method comprising:
    receiving a user input for conveying character data from a first user at a first communication device to a far-end user at a second communication device through a relay service providing translation services;
    determining an operational mode of the communication system from a tone mode and a text mode, wherein determining an operation mode of the communication system includes:
        determining the tone mode if the far-end user is not a live person; and
        determining the text mode if the far-end user is a live person;
    transmitting the character data to the relay service as at least one tone responsive to a determination of the tone mode for the operational mode; and
    transmitting the character data to the relay service as text data responsive to a determination of the text mode for the operational mode.

22. The method of claim 21, wherein determining the operational mode is performed automatically within the first communication device.

23. The method of claim 21, wherein determining the operational mode is responsive to receiving an indication of the operational mode from the relay service.

24. An apparatus, comprising:
    a video relay service configured to:
        provide translation services between video communications from a video communication device and speech communications from an audio communication device during communication sessions between a hearing-impaired user of the video communication device and a far-end user of the audio communication device;
        receive character data from the video communication device, the character data associated with a message desired to be conveyed to the audio communication device;
        determine an operational mode of the relay service to be a tone mode if the far-end user is not a live person;
        determine the operational mode of the relay service to be a text mode if the far-end user is a live person;
        convey the message to the audio communication device in a dual-tone multiple frequency (DTMF) format during the tone mode of the relay service regardless of a format of the character data; and
        convey the message to the audio communication device by transmitting speech data including speech from a call assistant speaking the message to the audio communication device during the text mode of the relay service regardless of the format of the character data.

* * * * *